United States Patent [19]

Aizawa et al.

[11] Patent Number: 4,837,058
[45] Date of Patent: Jun. 6, 1989

[54] LIQUID CRYSTAL CELL

[75] Inventors: Masanobu Aizawa; Shigekazu Yamauchi; Yuzo Hisatake, all of Tokyo, Japan

[73] Assignee: Stanley Electric Co., Ltd., Tokyo, Japan

[21] Appl. No.: 87,673

[22] Filed: Aug. 19, 1987

Related U.S. Application Data

[63] Continuation-in-part of Ser. No. 869,191, May 30, 1986, abandoned.

[30] Foreign Application Priority Data

Dec. 20, 1985 [JP] Japan ................................ 60-195240

[51] Int. Cl.$^4$ ................................................ G02F 1/13
[52] U.S. Cl. .......................................... 428/1; 350/344
[58] Field of Search ............................. 428/1; 350/344

[56] References Cited

U.S. PATENT DOCUMENTS 4,341,445 7/1982 Matsuyama et al. ............... 350/344
4,603,947 8/1986 Baeger et al. ........................ 350/344

Primary Examiner—Alexander S. Thomas
Attorney, Agent, or Firm—Louis E. Marn

[57] ABSTRACT

There is disclosed an improved liquid crystal cell wherein liquid crystal material is sealed between opposing transparent substrates and particles of particulate material are disposed on the transparent substrate thereby defining a uniform substrate interval and wherein the particulate material is disposed in a plurality of areas of less than 100 mm$^2$ with void areas defined between the areas of particulate material.

3 Claims, 2 Drawing Sheets

LIQUID CRYSTAL CELL

RELATED APPLICATIONS

This is a continuation-in-part application of U. S. application Ser. No. 869,191, filed on May 30, 1986 abandoned.

BACKGROUND OF THE INVENTION

1. Field of the Invention

The present invention relates to a liquid crystal cell having particulate material for establishing the distance between substrates and disposed on an internal surface of one of the transparent substrates between which is sealed a liquid crystal material.

2. Description of the Prior Art

FIG. 3 shows a schematic drawing in cross-section of a conventional liquid crystal cell in the configuration of a dot matrix display type wherein a liquid crystal material 2 is sealed between transparent glass substrates 1,1 with a sealing material 3. Particles 4 of particulate material for spacing the transparent substrates 1,1 are disposed over the entire internal surface of one of the transparent glass substrates 1,1.

In the liquid crystal cell of such conventional construction, the particles 4 of particulate material for such spacing are uniformly disposed between the transparent glass substrates 1,1; hence, the spacing or distance between the glass substrates 1,1 is at a uniform value. If it is assumed that the particles 4 of particulate material are solid bodies, such as glass fiber chips, the spacing or distance accuracy between the substrates 1,1 will be of from about ±0.1 to 0.2 μm. Specifically, in the liquid crystal cell of the dot matrix display type, a spacing or distance accuracy of ±0.1 to 0.2 μm is necessary to obtain the prescribed electro-optional characteristics; therefore, it is useful to use solid bodies having uniform outside diameters (like glass fiber chips) as the particles 4 of particulate material.

In the conventional liquid crystal cell, particles 4 of particulate material for spacing the substrates are uniformly scattered over the entire surface of transparent glass plate 1. Consequently, in an automobile-use crystal cell, for instance, where storage temperatures may reach as low as −40° C., vacuum bubbles 5 (spaces in a vacuum state), referring to FIG. 4, pose a problem. Namely, at a low temperature of about −40° C., liquid crystal material 2 sealed between the transparent glass substrates 1,1 contracts and reduces in volume. The transparent glass substrate 1 can not deflect inwardly because the particles 4 of particulate material for spacing are comprised of the solid bodies which are disposed over an entire surface thereby permitting the formation of vacuum bubbles 5.

Further, if the quantity of particles 4 of particulate material for spacing the substrates is reduced, i.e. distance between the particles 4 of particulate material increases which widens the spacing between particles 4 of particulate material, the transparent glass substrate 1 may deflect inwardly. In such case, however, pressure applied to the respective particles 4 of the particulate material during the pressurizing-heating process (reduction in quantity results in application of higher pressure to each particle 4 of particulate material), certain particles 4 of the particulate material are caused to disintegrate, thereby posing a problem of failure to maintain uniform spacing accuracy between substrates 1,1.

SUMMARY OF THE INVENTION

The present invention provides a liquid crystal cell in which no vacuum bubbles may occur between substrates, even at low temperatures, and uniform spacing accuracy between substrates is ensured, wherein the liquid crystal material is sealed between opposing transparent substrates and the particles of particulate material for uniform substrate intervals are disposed in a plurality of small areas at spaced-apart intervals. Since the particles of the particulate material for spacing the substrates are disposed in a plurality of small areas at spaced-apart intervals, the transparent substrates can deflect inwardly between the small areas (i.e. at voids where no particles of particulate material are disposed) even at such low temperatures, thereby preventing the formation of vacuum bubbles. Additionally, since the particles of particulate material are located in the spaced-apart small areas, no damage may occur to particles of the particulate material, and thus high accuracy of spacing between substrates can be obtained.

BRIEF DESCRIPTION OF THE DRAWINGS

Further objects and advantages of the present invention will become apparent upon consideration of the detailed description thereof, especially when taken with the accompanying drawings, wherein.

DETAILED DESCRIPTION OF THE INVENTION

Figure 1:
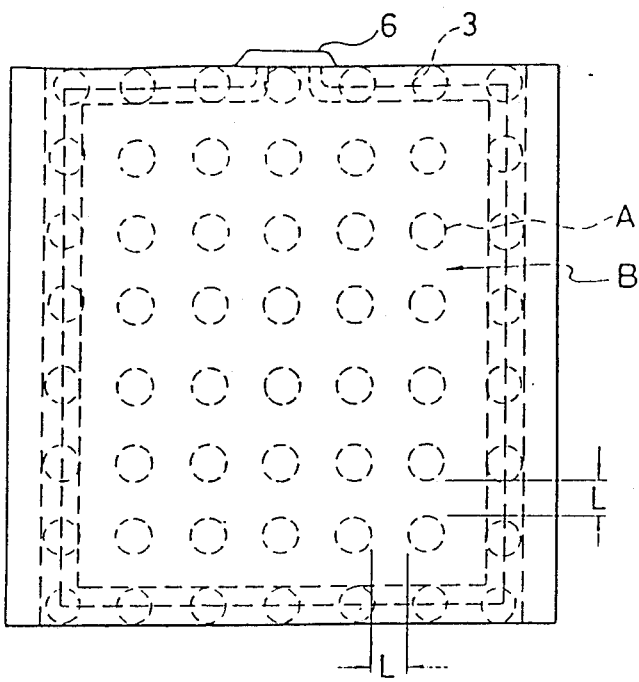
FIG. 1(a) is a plan view of the liquid crystal cell of the present invention.
FIG. 1(b) is a cross-sectional view of the liquid crystal cell of FIG. 1(a)
Figure 1:
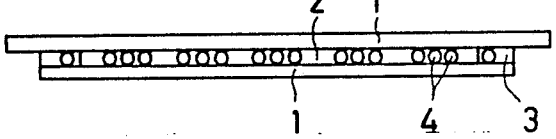

Referring now to the drawings, in FIG. 1(a), between transparent glass substrates 1 and 1, a liquid crystal material 2 is sealed with a sealing material 3. Particulate material formed of particles 4 having uniform diameters and comprised of solid bodies of glass fiber chips are disposed in a plurality of areas A, as shown in FIG. 1(a). The areas A of particulate material are of an area of 100 mm² or less in circular form (or polygonal form). The particles 4 of the particulate material are of an average of 1 mm or less.

Figure 2:
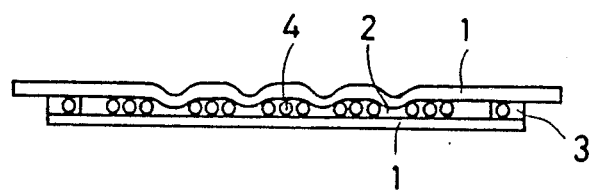
FIG. 2 is a cross-sectional view of the liquid crystal cell of the present invention at a low temperature.
Figure 3:
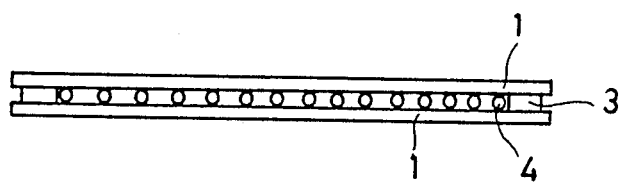
FIG. 3 is a cross-sectional view of a conventional liquid crystal cell.
Figure 4:
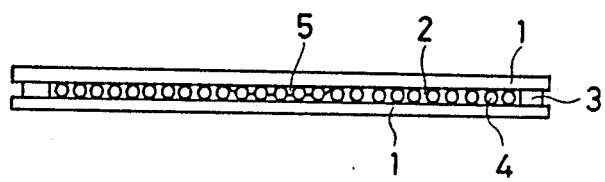
FIG. 4 is a cross-sectional view of a conventional liquid crystal cell with vacuum bubbles.

The liquid crystal cell of the present invention wherein the solid particulate material (glass fiber chips) is contained in areas A and disposed on the internal surface of the transparent glass substrate 1, ensures high spacing accuracy (for instance, ±0.1 to 0.2 μm) between substrates 1,1. At low temperatures (for instance, at −40° C.), the liquid material 2 contracts and thereby reduces in volume. At such a low temperature, the transparent substrate 1 can deflect inwardly at position 2 between the areas A of the particles 4 of particulate material, referring to FIG. 2. Since one of the transparent glass substrates 1 can deflect inwardly following a volumetric reduction of liquid crystal material 2, no vacuum bubbles can occur.

The construction of the present invention satisfies both the requirements of achieving high spacing accuracy between substrates and preventing the formation of vacuum bubbles, and simultaneously satisfies the following two contrary conditions:

a. To enhance spacing accuracy, it is necessary to uniformly dispose, as much as possible, the particles 4 of particulate material having uniform outside diameter.

b. To prevent formation of vacuum bubbles at low temperatures, it is necessary to dispose the particles 4 of particulate material as wide as possible so that the transparent glass substrate 1 can deflect inwardly at intervals between small areas of particles 4 of particulate material, following contraction of liquid crystal material 2.

The reason for disposing the particles 4 of the particulate material for spacing in the areas A at an average size of 1 mm or below is that at the pressurizing-heating sealing process, pressure applied to each particle 4 of particulate material is weakened to prevent damage to individual particles. The reason for making the areas A into circular or polygonal shapes each having a diameter of 100 mm$^2$ or below and for setting the distance of the void between adjacent areas A to at least 2 mm or above is to form an excellent balance between the areas A where deflection of the transparent glass substrate 1 is impossible at low temperatures, and voids or intervals between the areas A where deflection is possible (where no particles 4 of the particulate material exists). Results of tests have confirmed that vacuum bubbles can occur at low temperatures of $-40°$ C. when the areas A become larger than about 100 mm$^2$ and interval L between the areas are less than 2 mm.

A method of installing particles 4 of particulate material into the areas A includes, for instance, the method of coating the particles 4 of the particulate material on the transparent glass substrate 1 through a mask made of a flat plate with small holes arranged in a regular pattern.

Although the present invention is particularly useful for the liquid crystal cell of the dot matrix display system, it can also demonstrate a useful effect for general types of liquid crystal cells.

As explained above, the present invention is effective in preventing the formation of vacuum bubbles at low temperatures, and, moreover, in enhancing the accuracy of spacing between substrates because the particulate material for controlling the spacing or distance between the substrates is disposed on the internal surface of the transparent substrate in a plurality of areas with appropriate intervals between adjacent areas.

While the invention has been described in connection with exemplary embodiments thereof, it will be understood that many modifications will be apparent to those of ordinary skill in the art that this application is intended to cover any adaptations or variations thereof. Therefore, it is manifestly intended that this application be limited only by the claims and the equivalents thereof.

What is claimed is:

1. An improved liquid crystal cell, which comprises:
   a liquid crystal material sealed between opposing transparent substrates; and
   particulate material provided between said transparent substrates comprised of particles to define spacing therebetween, said particulate material being contained in spaced-apart areas of less than 100 mm$^2$ defining open areas therebetween, said areas of particulate material being spaced-apart a distance of at least about 2 mm.

2. The liquid crystal cell as claimed in claim 1 wherein said areas of particulate material are of circular or polygonal shape.

3. The liquid crystal cell as claimed in claims 1 or 2 wherein said particles of particulate material are of an average size of 1 mm or less.

* * * * *